(12) United States Patent
Iwaya

(10) Patent No.: US 11,952,095 B1
(45) Date of Patent: Apr. 9, 2024

(54) CONTAINER FOR FLYING OBJECT

(71) Applicant: Iwaya Giken Inc., Sapporo (JP)

(72) Inventor: Keisuke Iwaya, Sapporo (JP)

(73) Assignee: Iwaya Giken Inc. (JP)

( * ) Notice: Subject to any disclaimer, the term of this patent is extended or adjusted under 35 U.S.C. 154(b) by 0 days.

(21) Appl. No.: 18/475,555

(22) Filed: Sep. 27, 2023

(30) Foreign Application Priority Data

Sep. 28, 2022 (JP) .................................. 2022-155320

(51) Int. Cl.
*B64B 1/22* (2006.01)
*B64B 1/40* (2006.01)

(52) U.S. Cl.
CPC . *B64B 1/22* (2013.01); *B64B 1/40* (2013.01)

(58) Field of Classification Search
CPC .................................. B64B 1/22; B64B 1/40
See application file for complete search history.

(56) References Cited

U.S. PATENT DOCUMENTS 5,853,147 A 12/1998 Reinhard
2022/0340250 A1* 10/2022 Iwaya ...................... B64B 1/22

FOREIGN PATENT DOCUMENTS

JP 2022-051566 A 3/2022

* cited by examiner

*Primary Examiner* — Tye William Abell
(74) *Attorney, Agent, or Firm* — Harness, Dickey & Pierce, P.L.C.

(57) ABSTRACT

A container for a flight craft such as a gas balloon is provided. Part of the walls of the container is constituted of three separated plates. The first plate has one or more holes that causes gas to flow in and out of two spaces so that the pressure difference between a first space and a second space separated by the first plate is resolved but does not cause gas convection between those two spaces. As the flight craft ascends, a relationship T1<T2<T3<T4 occurs among the temperatures inside the first to a fourth space. The temperature gradient between the inside and outside of the container becomes less pronounced. Condensation is unlikely to form on any of the three plates. The first plate with the holes buffers the force that the second plate is subjected to due to a pressure difference between the inside and outside of the container.

3 Claims, 5 Drawing Sheets

CONTAINER FOR FLYING OBJECT

CROSS REFERENCE TO RELATED APPLICATIONS

This application claims priority to Japanese Patent Application No. 2022-155320 filed on Sep. 28, 2022, which is expressly incorporated by reference herein in its entirety.

TECHNICAL FIELD

This invention relates to a flight craft container such as that of a balloon and an airship.

BACKGROUND ART

When a flight craft such as a balloon and airship ascends, a temperature around the flight craft decreases. When the flight craft has an airtight container, as the flight craft ascends a temperature of walls of the container becomes lower than that of air inside the container. As a consequence, air in contact with the wall cools and water vapor in the air changes to water, resulting in condensation whereby water vapor forms on the inside of the walls.

When walls of the air-tight container for the flight craft are designed to be transparent, formation of condensation on the walls impedes a view outside the container for a person inside the container. Similarly, formation of condensation on the walls impedes clear capture of views outside the container by photographic equipment inside the container.

Moreover, if condensation forms on the walls of the container for the flight craft, objects in the vicinity of the condensation may be subject to water damage.

In JP2022-51566A, which is an invention made by the same inventor as that of the present application, there is disclosed an invention for reducing a likelihood of condensation from forming in an air-tight container for a flight craft. JP2022-51566A discloses a container for a flight craft in which at least a portion of the walls have a double layer structure, with one or more holes being provided in one of the double-layered walls, the holes being sufficiently large to allow gas to flow in and out but not to allow convection of the gas.

When using the container disclosed in JP2022-51566A, depending on external ambient temperature and humidity it may not be possible to adequately prevent condensation from forming in the container.

In view of the above circumstances, an object of this invention is to reduce the likelihood of condensation forming in a container for a flight craft, as compared to the invention described in JP2022-51566A.

SUMMARY

The present invention includes, as a first aspect, a container for a flight craft comprising: three or more plates that are at least partially spaced apart from each other, wherein: at least one of the three or more plates has no holes and provides an air-tight space inside the container for accommodating an object, and at least one of the three or more plates has one or more holes of a size that allows gas to flow in and out of two spaces within which the at least one plate is located with the one or more holes that resolve a pressure difference between the two spaces but do not enable gas convection between the two spaces.

The present invention includes, as a second aspect, a container according to the first aspect, wherein two or more of the three or more plates have one or more holes of a size that allow gas to flow in and out of the two spaces within which the plate is located with the one or more holes that resolve a pressure difference between the two spaces but do not enable gas convection between the two spaces.

The present invention includes, as a third aspect, a container according to the second aspect, wherein with respect to two or more plates with the one or more holes, at least one of a size and a number of the holes in each of the two or more plates is different.

Effects of Invention

According to the present invention, condensation is less likely to occur in a container for a flight craft, as compared to a container for the conventional technology.

DETAILED DESCRIPTION

Exemplary Embodiment

Figure 1:
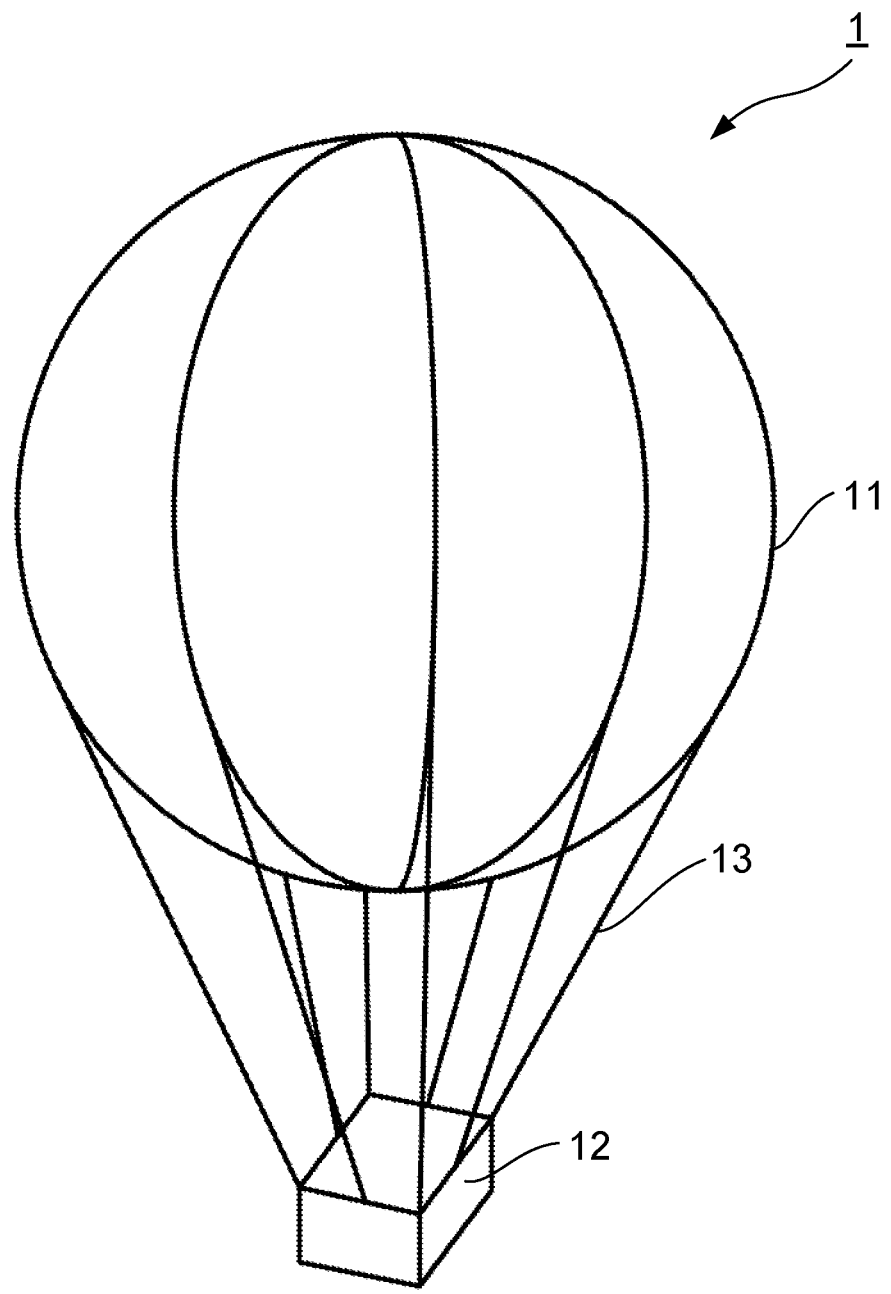
FIG. 1 shows an overall configuration of a flight craft according to an exemplary embodiment of the present invention.

FIG. 1 shows an overall configuration of Flight Craft 1 according to an exemplary embodiment of the present invention. Flight Craft 1 comprises Envelope 11 that contains a lighter-than-air gas such as helium, Container 12 suspended from Envelope 11 via a plurality of Suspension Ropes 13, which at one end are connected to Envelope 11 and at the other end are connected to Container 12 of Envelope 11 to suspend Container 12.

Figure 2:
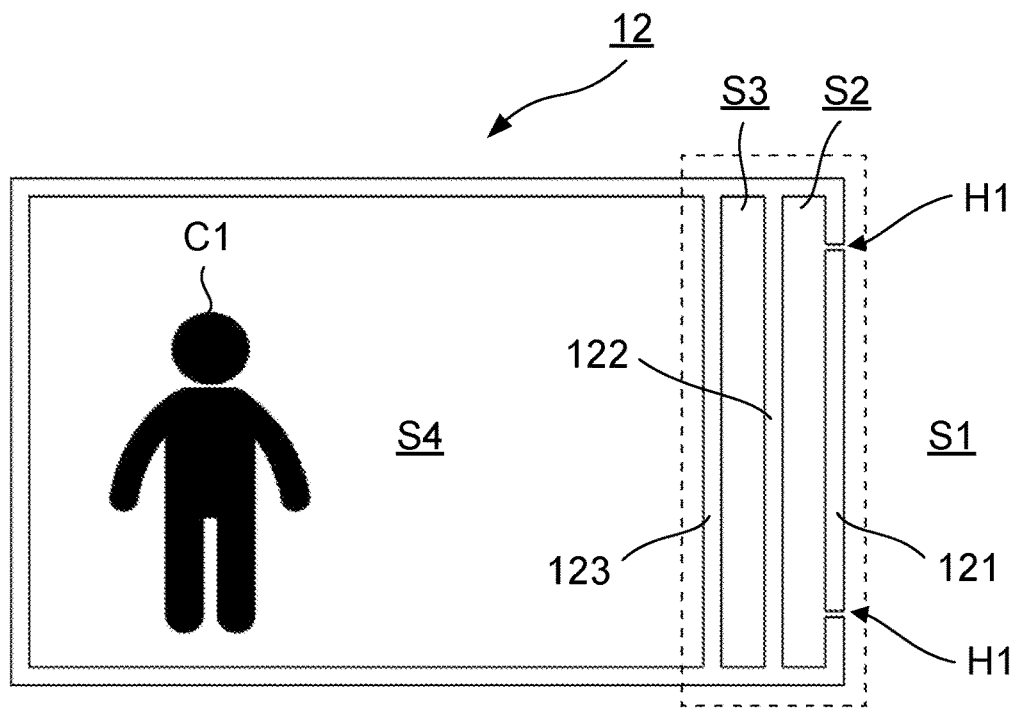
FIG. 2 is a cross-sectional view of a container according to the exemplary embodiment of the present invention.

FIG. 2 is a cross-sectional view of wall members of Container 12. Container 12 accommodates objects. Such objects may include, for example, a human or an animal. In FIG. 2, Crew Member C1 is shown as an example of an object accommodated in Container 12.

Among the wall members of Container 12, the portion enclosed by the dashed line is constituted of three plates spaced apart from each other, namely Plate 121, Plate 122, and Plate 123.

Plate 121, Plate 122, and Plate 123 form Space S2, Space S3, and Space S4 inside Container 12.

Plate 121 is provided between Space S1, which is outside Container 12, and Space S2, which is inside Container 12, and separates the two spaces. Plate 122 is provided between Space S2 and Space S3, both of which are inside Container 12, and separates the two spaces. Plate 123 is provided between Space S3 and Space S4, both of which are inside Container 12, and separates the two spaces.

Herein, pressure inside Space S1 is referred to as Pressure P1, pressure inside Space S2 is referred to as Pressure P2, pressure inside Space S3 is referred to as Pressure P3, and pressure inside Space S4 is referred to as Pressure P4.

Also herein, temperature inside Space S1 is referred to as Temperature T1, temperature inside Space S2 is referred to as Temperature T2, temperature inside Space S3 is referred to as Temperature T3, and temperature inside Space S4 is referred to as Temperature T4.

Plate 122 and Plate 123 have no holes and together form an airtight space for accommodating objects inside Container 12.

Plate 121, which separates Space S1 and Space S2, has one or more Holes H1. A size each of Holes H1 is adjusted to allow gas to flow in and out of Space S1 and Space S2 to resolve a pressure difference between the two spaces but not to enable gas convection between the two spaces.

As Flight Craft 1 ascends and Temperature T1 outside Container 12 decreases, temperatures inside Spaces S1 to S4 have the following relationship:

$$T1 < T2 < T3 < T4.$$

Namely, in the three-layered portion of the wall members of Container 12, temperature increases in stages from the outside to the inside of Container 12. In other words, the temperature gradient between the inside and outside of Container 12 is more gradual in the three-layered portion than in the non-three-layered portion of the wall members of Container 12. As a result, there is little likelihood of condensation forming on any of Plate 121, Plate 122, or Plate 123.

Accordingly, when Plate 121, Plate 122, and Plate 123 are transparent, a view outside of Container 12 by person in Space S4 is unlikely to be impeded by formation of condensation. Similarly, pictures of a view outside of Container 12 taken by photographic device in Space S4 via the same plates (121, 122 and 123) are also unlikely to be impeded by formation of condensation, and will have good clarity. In addition, objects in Space S4 are unlikely to become wet due to condensation forming on Plate 123.

As Flight Craft 1 ascends and Pressure P1 in Space S1 around Container 12 decreases, pressures in Spaces S1 to S4 have the following relationship:

$$P1 \leq P2 \ll P3 < P4.$$

Here, "<" means that the right side is larger than the left side, but the difference between the left and right sides gradually decreases. Also, "<<" here means that the right side is significantly larger than the left side (the difference between the left and right sides is larger than "<").

As shown above, Pressure P2 in Space S2 and Pressure P3 in Space S3 are substantially different. Therefore, Plate 122, which is provided between Space S2 and Space S3, is subject to large force acting from the inside to the outside due to a pressure difference between the two spaces. To resist this large force, Plate 122 has a higher stiffness than both Plate 121 and Plate 123.

The difference between Pressure P1 in Space S1 and Pressure P2 in Space S2 is resolved by entry and exit of gas through Holes H1. However, gas-flow velocity through Holes H1 is not sufficient to immediately resolve a pressure difference between pressure P1 and P2 generated upon ascent of Flight Craft 1. Rather, the pressure difference is gradually resolved.

Thus, as Flight Craft 1 ascends Plate 121 is subjected to a part of the force acting from the inside to the outside due to the difference inside and outside Container 12. As a result, a force to which Plate 122 is subjected is reduced. More specifically, Plate 121 with Holes H1 buffers the force to push Plate 122 outward, and consequently a rigidity required for Plate 122 and an overall weight of Container 12 can be reduced. Furthermore, distortion of Plate 122 is minimized, and distortion is less likely to occur in an outer view observed (or photographed) from the inside of Container 12.

Modifications

The above-described Container 12 of Flight craft 1 is of an exemplary embodiment of the present invention, and may be modified in various ways. Following are examples of modifications of the above-described embodiment. Two or more of the above-described embodiments and the following modifications may be combined.

(1) In Container 12 according to the embodiment described above, Plate 121 has one or more Holes H1. Alternatively, Plate 122 or Plate 123 may be configured to have one or more holes similar to Holes H1.

Figure 3:
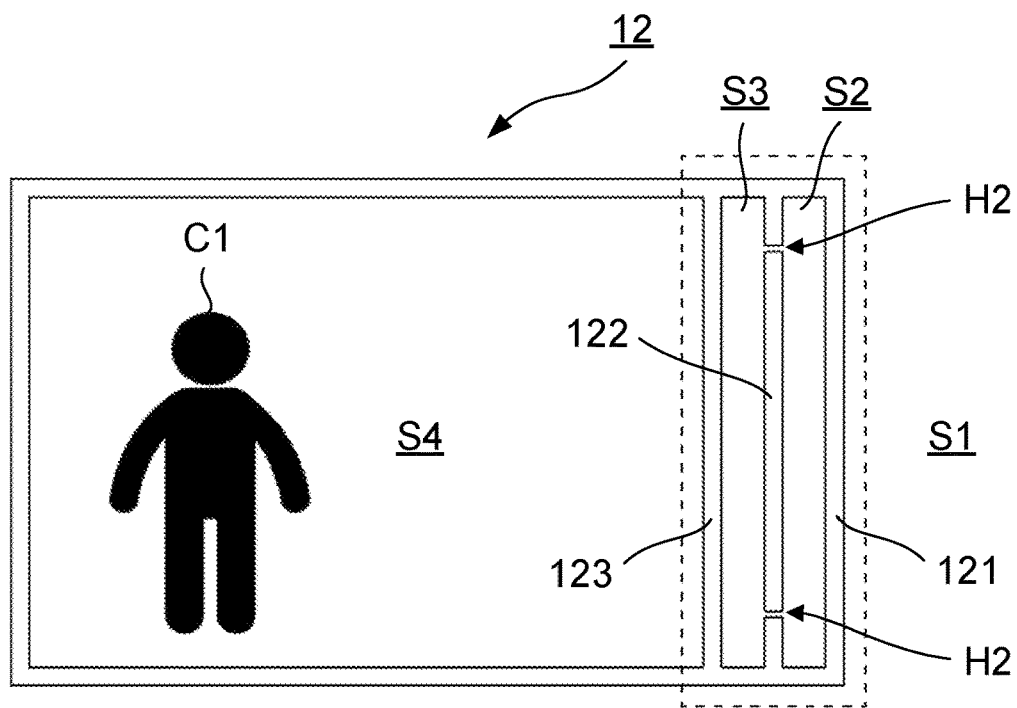
FIG. 3 is a cross-sectional view of a container according to a modification of the exemplary embodiment of the present invention.

FIG. 3 is a cross-sectional view of an example of Container 12 according to this modification. In Container 12 shown in FIG. 3, Plate 121 has no Holes H1 and Plate 122 has one or more Holes H2 similar to Holes H1.

In Container 12 shown in FIG. 3 the relationship among the temperatures inside Spaces S1 to S4 as Flight Craft 1 ascends is as follows:

$$T1 < T2 < T3 < T4.$$

Therefore, as in the case of Container 12 in the embodiment described above, condensation is unlikely to form on any of Plate 121, Plate 122, and Plate 123.

In Container 12 shown in FIG. 3, the relationship among the pressures in Spaces S1 to S4 as Flight Craft 1 ascends is as follows:

$$P1 \ll P2 \leq P3 < P4.$$

In this case, Plate 121 is subjected to the greatest force, but Plate 122 serves to buffer the force. As a result, a rigidity required for Plate 121 is reduced and an overall weight of Container 12 can be reduced. Furthermore, distortion of Plate 121 is minimized, and distortion is less likely to occur in a view observed (or photographed) from the inside of Container 12.

In this case, Plate 122 also serves to buffer forces acting on Plate 123. As a result, distortion in Plate 123 is minimized, and distortion is less likely to occur in a view observed (or photographed) from the inside of Container 12.

Figure 4:
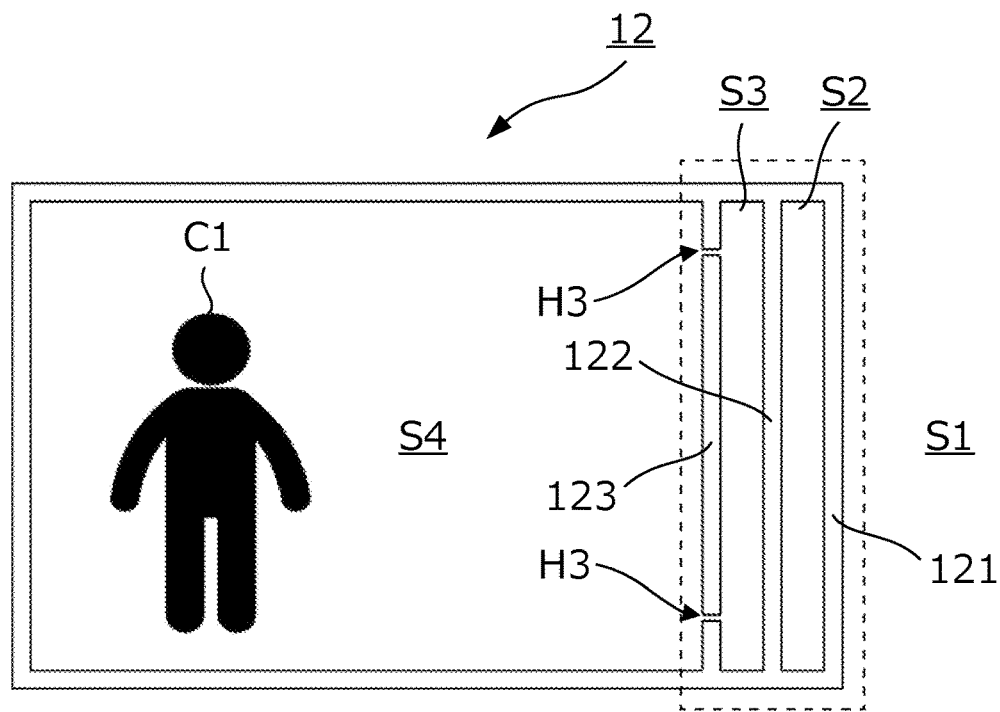
FIG. 4 is a cross-sectional view of a container according to a modification of the exemplary embodiment of the present invention.

FIG. 4 is a cross-sectional view of another example of Container 12 according to this modification. In Container 12 shown in FIG. 4, Plate 121 has no Holes H1, Plate 122 has no Holes H2, and Plate 123 has one or more Holes H3 similar to Holes H1.

In Container 12 shown in FIG. 4 the relationship among the temperatures inside Spaces S1 to S4 as Flight Craft 1 ascends is as follows:

$$T1 < T2 < T3 < T4.$$

Therefore, as in the case of Container 12 in the embodiment described above, condensation is unlikely to from on any of Plate 121, Plate 122, and Plate 123.

In Container 12 shown in FIG. 4, the relationship among the pressures inside Spaces S1 to S4 as Flight Craft 1 ascends is as follows:

$$P1 \ll P2 \leq P3 < P4.$$

In this case, Plate 123 does not serve to significantly reduce the force acting on Plate 121, but it does buffer the force acting on Plate 122. As a result, distortion in Plate 123 is minimized, and distortion is less likely to occur in a view observed (or photographed) from the inside of Container 12.

(2) In Container 12 according to the embodiment described above, only one of the three plates that make up the three-layered portion of the wall members of Container 12, i.e., only Plate 121, has one or more holes. Alternatively, two of those three plates may have one or more holes.

Figure 5:
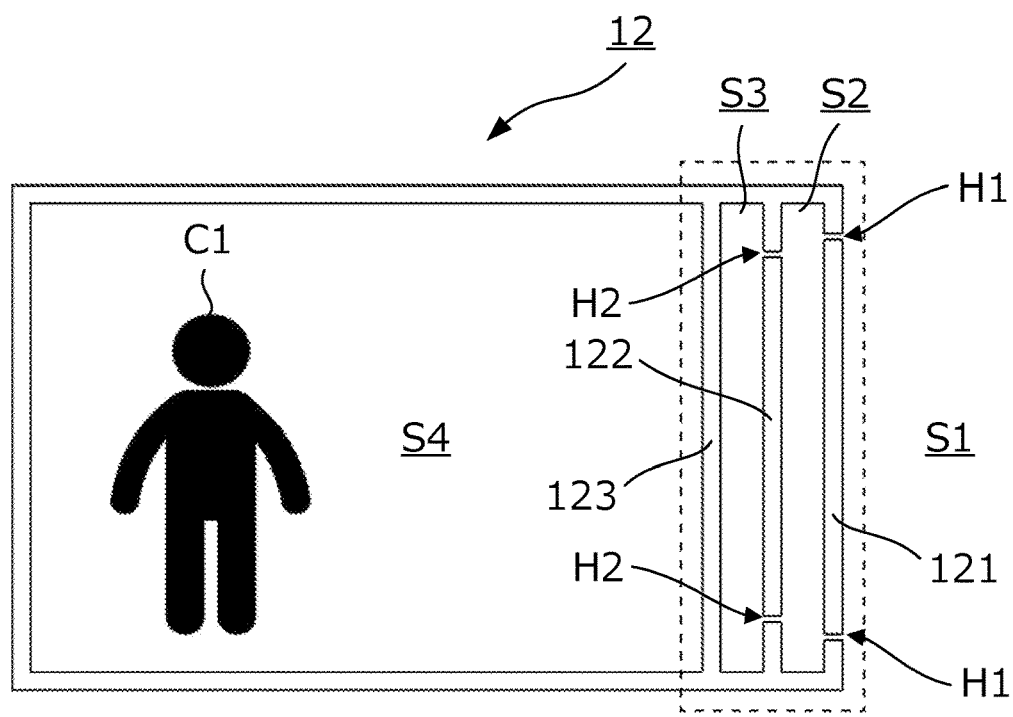
FIG. 5 is a cross-sectional view of a container according to a modification of the exemplary embodiment of the present invention.

FIG. 5 is a cross-sectional view of an example of Container 12 according to this modification. In Container 12 shown in FIG. 5, Plate 121 has Holes H1, Plate 122 has Holes H2, and Plate 123 has no holes.

In Container 12 shown in FIG. 5 the relationship among the temperatures inside Spaces S1 to S4 as Flight Craft 1 ascends is as follows:

$$T1 < T2 < T3 < T4.$$

Therefore, as in the case of Container 12 in the embodiment described above, condensation is unlikely to form on any of Plate 121, Plate 122, and Plate 123.

In Container 12 shown in FIG. 5, the relationship among the pressures in Spaces S1 to S4 as Flight Craft 1 ascends is as follows:

$$P1 \leq P2 < P3 \ll P4.$$

In this case, Plate 123 is subjected to the greatest force, but Plate 121 and Plate 122 serve to buffer the force. As a result, a rigidity required for Plate 123 is reduced, and an overall weight of Container 12 can be reduced. In addition, distortion in Plate 123 is minimized, and distortion is less likely to occur in an outer view that is observed (or photographed) from the inside of Container 12.

Figure 6:
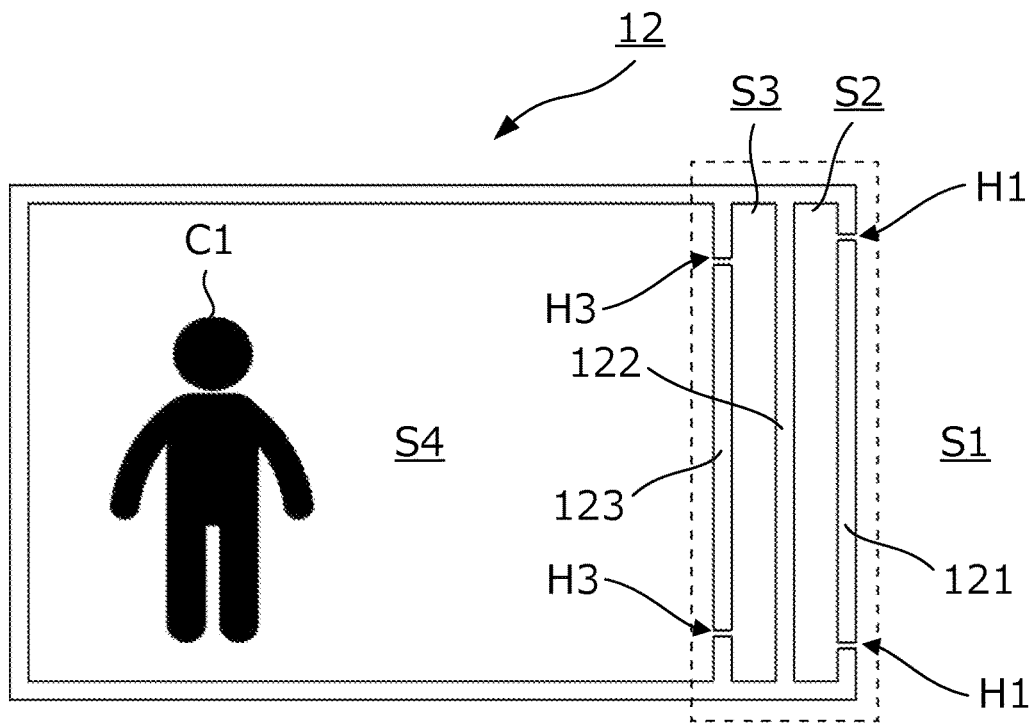
FIG. 6 is a cross-sectional view of a container according to a modification of the exemplary embodiment of the present invention.

FIG. 6 is a cross-sectional view of an example of Container 12 according to this modification. In Container 12 shown in FIG. 6, Plate 121 has Holes H1, Plate 123 has Holes H3, and Plate 122 has no holes.

In Container 12 shown in FIG. 6 the relationship among the temperatures inside Spaces S1 to S4 as Flight Craft 1 rises is as follows:

$$T1 < T2 < T3 < T4.$$

Therefore, as in the case of Container 12 in the embodiment described above, condensation is unlikely to form on any of Plate 121, Plate 122, and Plate 123.

In Container 12 shown in FIG. 6, the relationship among the pressures in Spaces S1 to S4 as Flight Craft 1 ascends is as follows:

$$P1 \leq P2 \ll P3 < P4.$$

In this case, Plate 122 is subjected to the greatest force, but Plate 121 and Plate 123 serve to buffer the force. As a result, a rigidity required for Plate 122 is reduced, and an overall weight of Container 12 can be reduced. In addition, distortion in Plate 122 is reduced, and distortion is less likely to occur in a view that is observed (or photographed) from the inside of Container 12.

Figure 7:
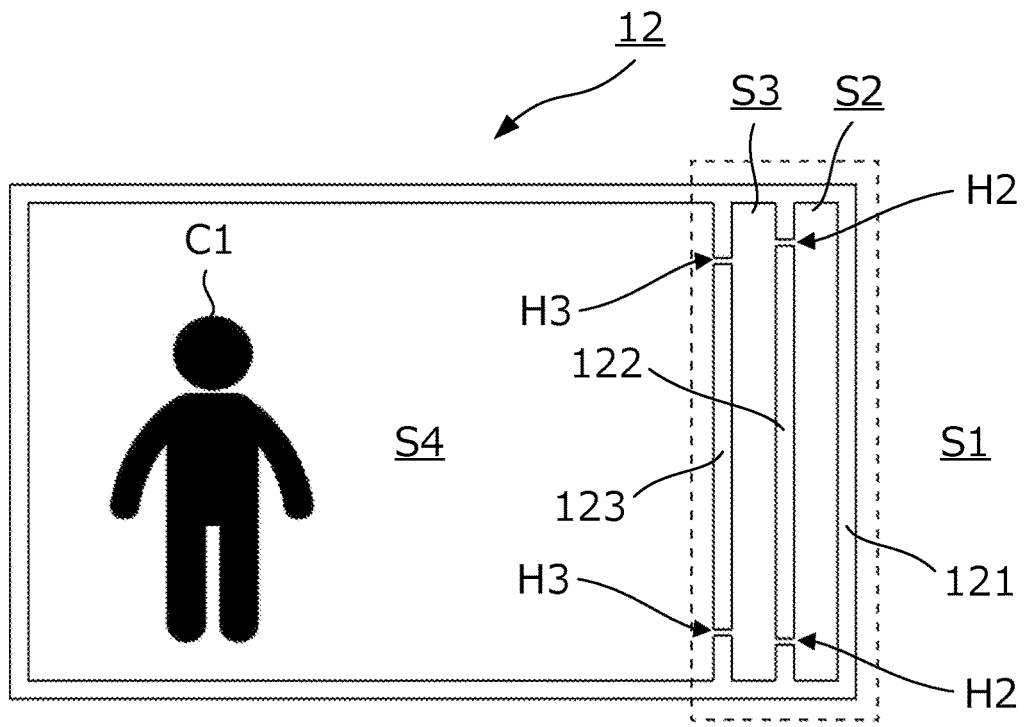
FIG. 7 is a cross-sectional view of a container according to a modification of the exemplary embodiment of the present invention.

FIG. 7 is a cross-sectional view of yet another example of Container 12 according to this modification. In Container 12 shown in FIG. 7, Plate 122 has Holes H2, Plate 123 has Holes H3, and Plate 121 has no holes.

In Container 12 shown in FIG. 7 the relationship among the temperatures inside Spaces S1 to S4 as Flight Craft 1 ascends is as follows:

$$T1 < T2 < T3 < T4.$$

Therefore, as in the case of Container 12 in the embodiment described above, condensation is unlikely to occur in any of Plate 121, Plate 122, and Plate 123.

In Container 12 shown in FIG. 7, the relationship among the pressures in Spaces S1 to S4 as Flight Craft 1 ascends is as follows:

$$P1 \ll P2 \leq P3 < P4.$$

In this case, Plate 121 is subjected to the greatest force, but Plate 122 and Plate 123 serve to buffer the force. As a result, a rigidity required for Plate 121 is reduced and an overall weight of Container 12 can be reduced. In addition, distortion of Plate 121 is reduced, and distortion is less likely to occur in a view of an outer scene observed (or photographed) from the inside of Container 12.

In this modification of Container 12, with respect to the two plates having holes, at least one of the number and size of the holes in each of those plates may be different. For example, in Container 12 shown in FIG. 5, at least one of the number and size of Holes H1 in Plate 121 and Holes H2 in Plate 122 may be adjusted to reduce a force that acts on Plate 121 and Plate 122, and a rigidity required for Plate 121 and Plate 122. Such adjustments will often result in at least one of the numbers and sizes of Holes H1 and Holes H2 being different.

(3) In the embodiment described above, only one portion of the wall members of Container 12 is a three-layered structure. Two or more portions of the wall members of Container 12 may be three-layered structure.

Figure 8:
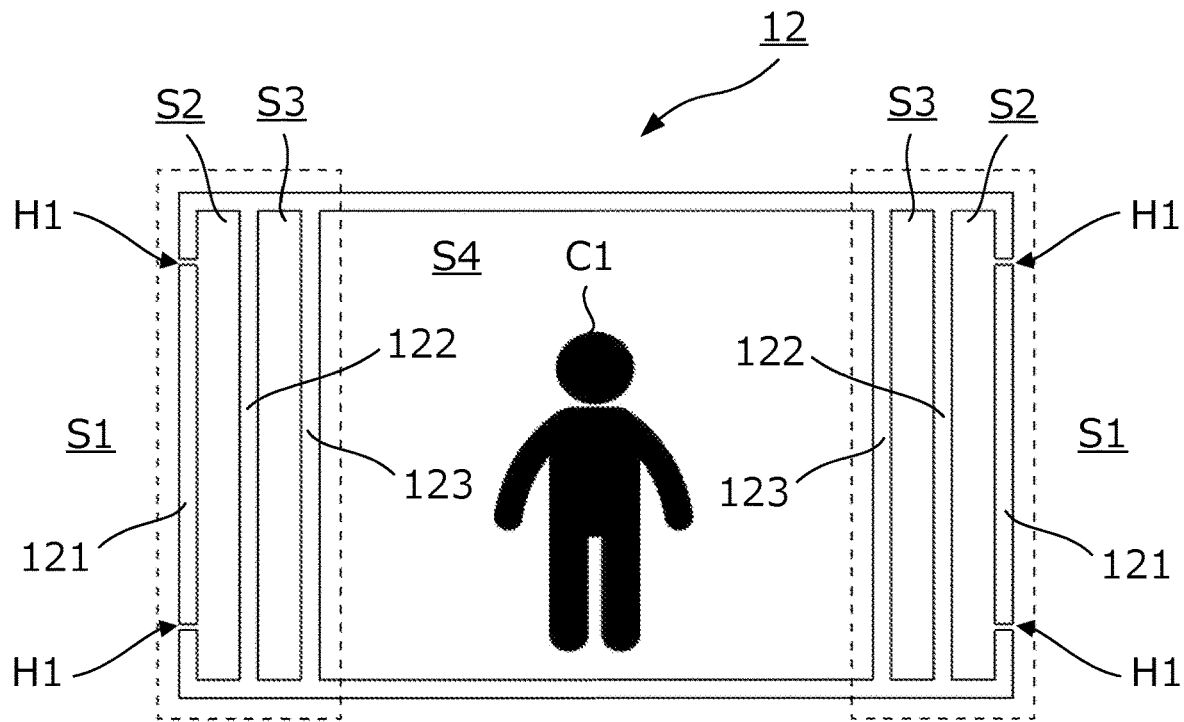
FIG. 8 is a cross-sectional view of a container according to a modification of the exemplary embodiment of the present invention.

FIG. 8 is a cross-sectional view of an example of Container 12 according to this modification. In Container 12 shown in FIG. 8, each of the portions of the two regions surrounded by dashed lines is a three-layered structure.

In addition, all of the wall members of Container 12 may be three-layered structures.

Figure 9:
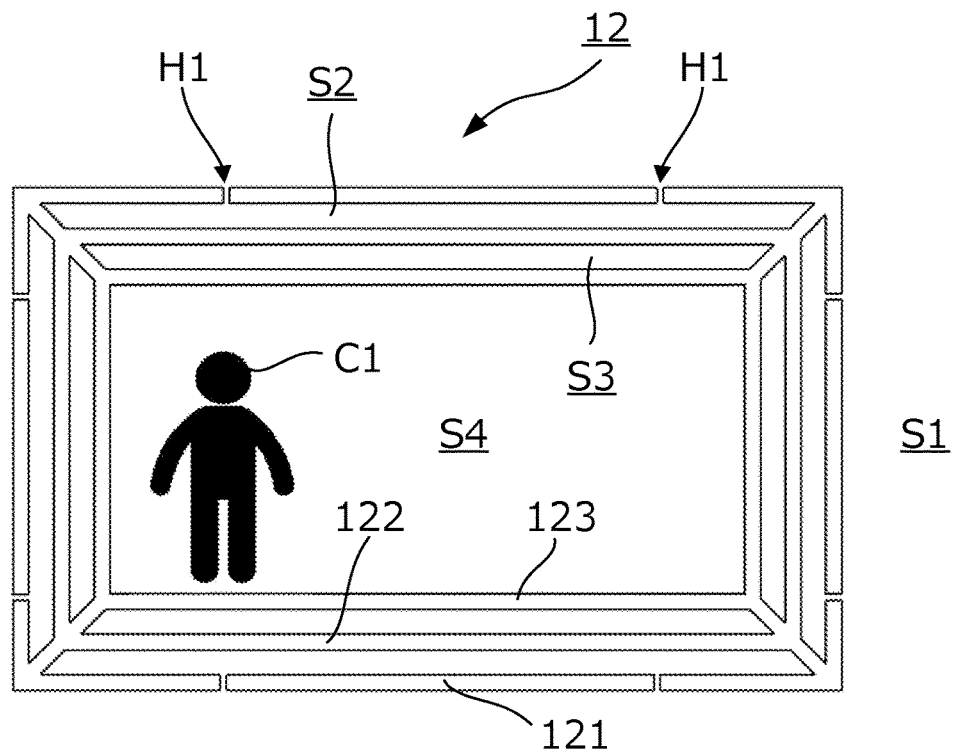
FIG. 9 is a cross-sectional view of a container according to a modification of the exemplary embodiment of the present invention.

FIG. 9 is a cross-sectional view of an example of Container 12 according to this modification. In Container 12 shown in FIG. 9, all of the wall members of Container 12 are three-layered structures.

(4) In the embodiment described above, at least a part of the wall members of Container 12 are three-layered structures, i.e., they consist of three plates spaced apart from each other. Alternatively, at least a part of the wall members of Container 12 may consist of four or more plates spaced from each other. In that case, at least one of the four or more plates of Container 12 has no holes, and at least one of the four or more plates of Container 12 has one or more holes. Two or more of the four or more plates (e.g., three plates) of Container 12 may have one or more holes.

(5) In the embodiment described above, the flight craft is assumed to be a gas balloon, but the type of flight craft is not limited to a gas balloon, and may be another type of flight craft such as a hot-air balloon or a blimp.

The invention claimed is:

1. A container for a flight craft comprising:
three or more plates that are at least partially spaced apart from each other, wherein:
    at least one of the three or more plates has no holes and provides an air-tight space inside the container for accommodating an object, and
    at least one of the three or more plates has one or more holes of a size that allows gas to flow in and out of two spaces within which the at least one plate is located with the one or more holes that resolve a pressure difference between the two spaces but do not enable gas convection between the two spaces.

2. The container according to claim 1, wherein
two or more of the three or more plates have one or more holes of a size that allow gas to flow in and out of the two spaces within which the plate is located with the one or more holes that resolve a pressure difference between the two spaces but do not enable gas convection between the two spaces.

3. The container according to claim 2, wherein
with respect to two or more plates with the one or more holes, at least one of a size and a number of the holes in each of the two or more plates is different.

* * * * *